US006163520A

United States Patent [19]

Kobayashi et al.

[11] Patent Number: 6,163,520

[45] Date of Patent: Dec. 19, 2000

[54] DISC CHUCKING MECHANISM

[75] Inventors: Kazutaka Kobayashi; Masayuki Katagiri; Hiromitsu Takei, all of Nagano, Japan

[73] Assignee: Kabushiki Kaisha Sanyo Seiki Seisakusho, Nagano, Japan

[21] Appl. No.: 09/271,509

[22] Filed: Mar. 18, 1999

[30] Foreign Application Priority Data

Mar. 18, 1998 [JP] Japan .................................. 10-068529

[51] Int. Cl.[7] .................................................. G11B 17/028

[52] U.S. Cl. ........................................ 369/271; 360/99.12

[58] Field of Search .................................... 369/264, 269, 369/270, 271; 360/99.12

[56] References Cited

U.S. PATENT DOCUMENTS

| | | | |
|---|---|---|---|
| 4,730,299 | 3/1988 | Kamoshita et al. | 369/264 |
| 4,827,468 | 5/1989 | Odawara et al. | 369/271 |
| 5,128,818 | 7/1992 | Koizumi et al. | 360/99.04 |
| 5,457,676 | 10/1995 | Park | 369/270 |
| 5,501,760 | 3/1996 | Mukawa | 156/305 |
| 5,668,792 | 9/1997 | Choi | 369/271 |
| 5,761,186 | 6/1998 | Mushika et al. | 369/271 |
| 5,825,746 | 10/1998 | Lee | 369/270 |

FOREIGN PATENT DOCUMENTS 4-131178 12/1992 Japan .

*Primary Examiner*—William Klimowicz

*Attorney, Agent, or Firm*—Sughrue, Mion, Zinn Macpeak & Seas, PLLC

[57] ABSTRACT

A disc chucking mechanism includes a turn table 3 on which a disc 19 with a center hole 20 is located, a chucking magnet 10 for magnetically attracting a center hub 21 of the disc 19 to it, and a magnet yoke 60. The magnet yoke 60 includes a ring-like member which is inserted between the turn table 3 and the chucking magnet 10, engaging portions 62 which are extended from the ring-like member of the magnet yoke toward the turn table 3, and brought into engagement with the turn table, and magnet engaging portions 61 which are extended in the direction opposite to the bending direction of the engaging portions 62, and urgingly fix the chucking magnet 10.

11 Claims, 3 Drawing Sheets

DISC CHUCKING MECHANISM

BACKGROUND OF INVENTION

1. Field of the Invention

The present invention relates to a disc chucking mechanism which rotates, together with a turn table, a recording medium disc, such as an optical disc or a magneto-optical disc, to be located on the turn table, to write information into the recording medium disc and read it from the same. More particularly, the invention relates to a disc chucking mechanism for positioning a disc with a magnetic center hub and holding the same.

2. Related Art

In a disc drive which writes information signals into a recording medium disc, such as an optical disc or a magneto-optical disc, or reproducing stored information from the same while rotating the recording medium disc, the disc must be rotated in a state that an optical pickup device faces a recording track on the disc.

Therefore, the disc drive is provided with a disc chucking mechanism including a turn table. A rotation driving mechanism drives and rotates the turn table, together with a disc being put on the turn table at a predetermined location. Examples of the conventional the disc chucking mechanism are U.S. Pat. No. 5,501,760 and Unexamined Utility Model Publication Hei.4-131178.

In the disc chucking mechanism disclosed in U.S. Pat. No. 5,501,760, a chucking magnet is mounted on a turn table, and a magnetic force exerting between the chucking magnet and the center hub of the disc is utilized to attract a disc to the turn table. The chucking magnet is bonded onto the turn table by adhesive.

In the disc chucking mechanism disclosed in Unexamined Utility Model Publication Hei.4-131178, a hub table substantially integral with the turn table is shaped so that the chucking magnet is sandwiched between the hub table and the turn table, whereby the chucking magnet is fastened onto the turn table.

In the disc chucking mechanism by utilizing the magnetic force between the disc and the center hub, to fasten the chucking magnet for generating a magnetic attraction force to the turn table, adhesive is used or the turn table or the hub table are specially designed in shape.

The technique using adhesive (first technique) is disadvantageous in that the fixing strength is unsatisfactory, and that a subtle difference of adhesion condition results in a large variation of adhesion strength, leading to deterioration of a reliability of the disc chucking mechanism.

The technique (second technique) in which the chucking magnet is mechanically fixed is advantageous over the first technique in that a sufficient fastening strength is secured, and provides a reliable disc chucking mechanism, but disadvantageous in that the component part is specially designed, and its shape is complicated, leading to increase of its manufacturing cost.

SUMMARY OF INVENTION

Accordingly, an object of the present invention is to provide a disc chucking mechanism for driving and rotating a disc with a center hub made of magnetic material, which the mechanism 1) fastens a chucking, which generates a magnetic attraction force present between it and the center hub of the disc, to a turn table, with a sufficiently large fastening strength, 2) does not require any specially shaped turn table for fastening the chucking magnet, and 3) simplifies the structure of the disc chucking mechanism.

Another object of the present invention is to provide a disc chucking mechanism which 1) efficiently utilizes a magnetic flux developed from a chucking magnet by use of a chucking-magnet fastening means, and 2) minimizes the magnetic flux that is developed from a chucking magnet and will leak to its vicinity.

According to an aspect of the present invention, a disc chucking mechanism comprising:

- a turn table, on which a disc with a center hole is disposed, driven by a rotation driving mechanism;
- a chucking magnet for magnetically attracting a center hub of the disc;
- a magnet yoke including:
  - a ring-like member inserted between said turn table and said chucking magnet;
  - engaging portions extended from the ring-like member of the magnet yoke toward the turn table, and brought into engagement with said turn table; and
  - magnet engaging portions extended in the direction opposite to the extending direction of the engaging portions, and fixing the chucking magnet.

In a first disc chucking mechanism constructed according to the present invention, 1) the ring-like member is inserted between the turn table and the chucking magnet used for producing a disc chucking force, and 2) the engaging portions are extended from the ring-like member of the magnet yoke toward the turn table, and brought into engagement with the turn table, whereby the magnet yoke is fastened to the turn table. Further, the magnet engaging portions are extended in the direction opposite to the bending direction of the engaging portions, and the chucking magnet are urgingly fixed by the magnet engaging portions, whereby the chucking magnet is fastened to the turn table. The unique chucking-magnet mounting structure thus constructed is able to produce a satisfactorily large fixing strength when comparing with the conventional chucking-magnet mounting means in which the chucking magnet is bonded to the turn table by adhesive or mechanically fastened to the turn table by properly shaping the turn table or the hub table, and therefore reliably fastens the chucking magnet to the turn table. The chucking magnet may be fastened to the turn table by merely using an additional part, i.e., the magnet yoke, which can be formed by simple working, for example, pressing, of a magnetic material. The disc chucking mechanism does not need the careful working of the turn table, and hence may be reduced in cost to manufacture.

Further, it is noted that the magnet yoke is made of magnetic material, and placed on the chucking magnet. It functions as a yoke of the chucking magnet. Therefore, the magnetic flux developed by the chucking magnet is efficiently utilized to provide an increased chucking force. The magnet yoke provides a magnetic path for the magnetic flux by the chucking magnet. Therefore, it serves as a shielding member for preventing the magnetic flux by the chucking magnet from leaking to its vicinity is minimized. In this respect, there is less chance that the magnetic flux adversely affects the recording/reproducing operation of information to and from the disc, and other operations.

In a second disc chucking mechanism of the invention, the tapered surfaces are formed on the inner or outer circumferential edge of the chucking magnet. The magnet engaging portions of the magnet yoke are bent toward the tapered surfaces. Therefore, the magnet engaging portions are put on the tapered surfaces of the chucking magnet, respectively, and the chucking magnet are hard to be broken.

In a third disc chucking mechanism of the invention, the chucking magnet includes the cut-outs. The cut-outs are engaged with the magnet yoke, whereby the chucking magnet is immovable in the circumferential direction. Any special means is not required for restraining the rotation of the chucking magnet.

DETAILED DESCRIPTION OF PREFERRED EMBODIMENTS

A preferred form of a disc chucking mechanism constructed according to the present invention will be described with reference to the accompanying drawings.

Figure 1:
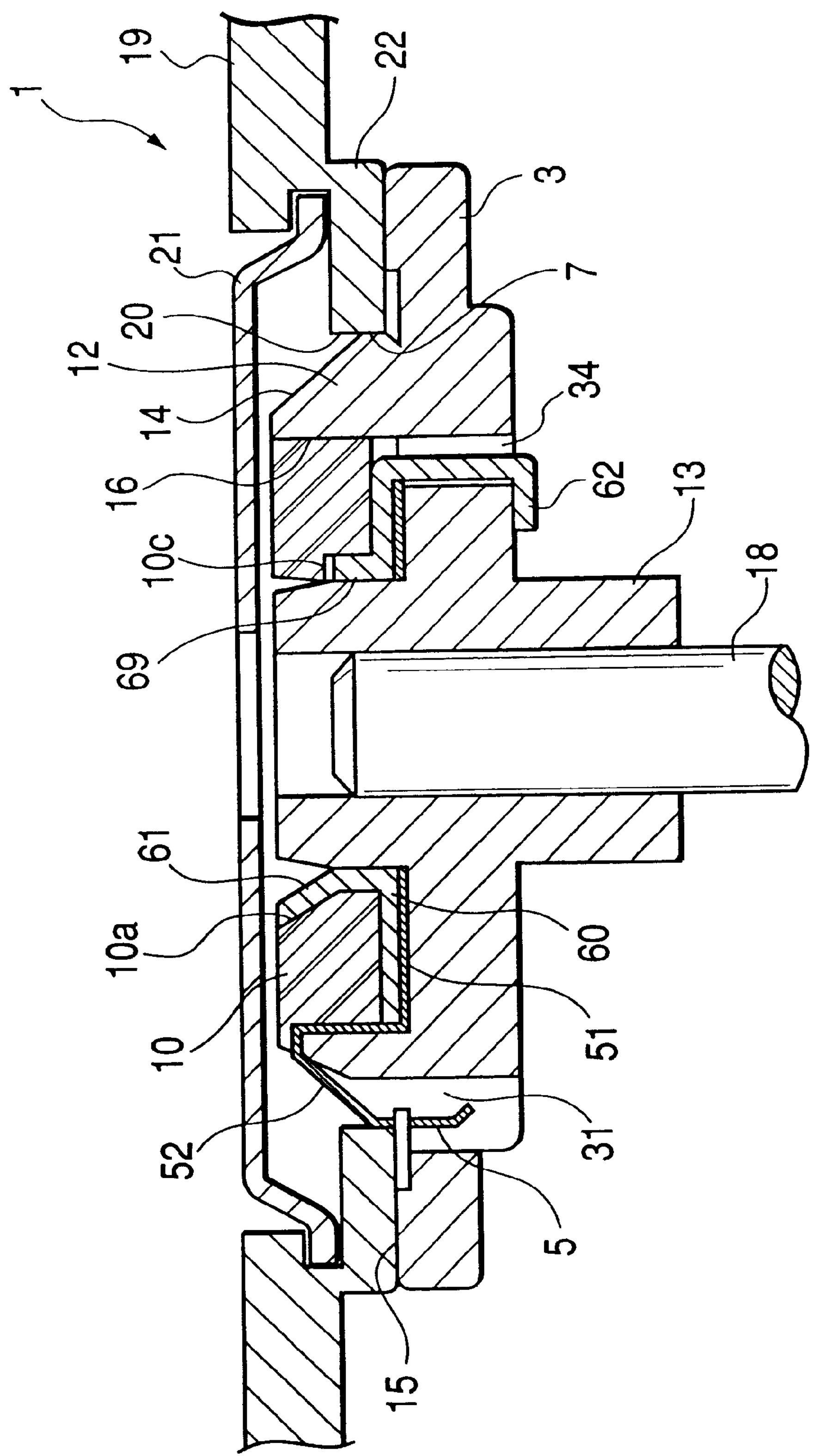
FIG. 1 is a cross sectional view showing a disc chucking mechanism which is a first embodiment of the invention.
Figure 2:
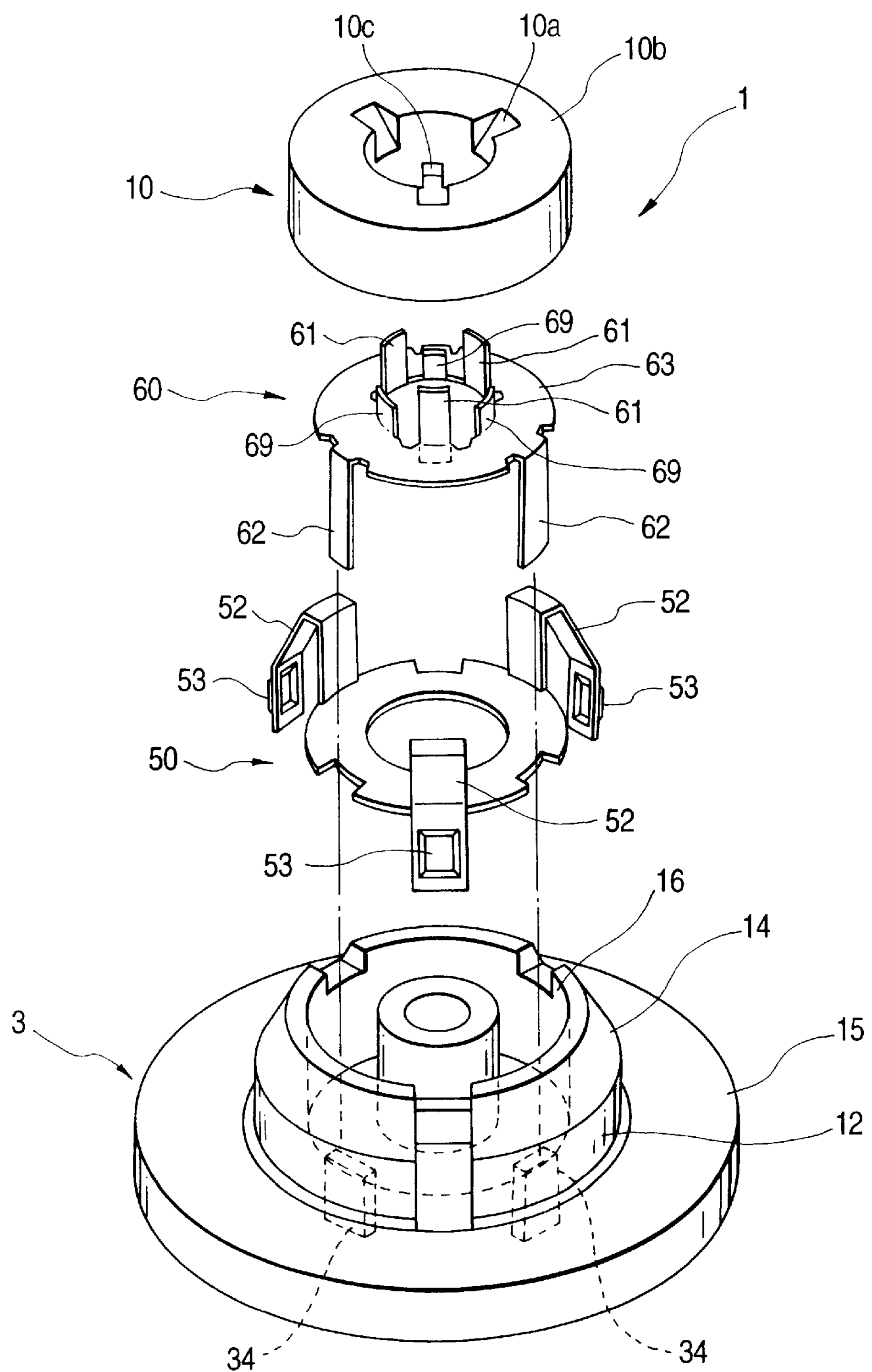
FIG. 2 is an exploded view showing the FIG. 1 disc chucking mechanism.

In FIGS. 1 and 2, a disc chucking mechanism 1 includes a one-piece molded turn table 3, made of, e.g., resin, as a major component. A rotary output shaft 18, which forms rotation/drive means, is press fit into the center hole of a boss 13, which is integral with the turn table 3. With this structure, the turn table 3 is rotated together with the rotary output shaft.

A cylindrical portion 12 is integrally formed on the upper surface of the turn table 3 in a state that it is centered at the center of rotation of the turn table 3. The cylindrical portion 12 is somewhat smaller in diameter than a center hole 20 of a disc 19. The outer circumferential surface of the upper half of the cylindrical portion 12 takes the form of a conical surface 14. In setting the disc to the turn table, the conical surface 14 guides the center hole 20 of the disc 19 to the cylindrical portion 12. The turn table 3 includes a flange portion continuous to the lower end of the cylindrical portion 12. The upper surface of the flange portion serves as a disc mounting surface 15, and positions the chucked disc 19 in the axial direction thereof.

The disc chucking mechanism shown in FIGS. 1 and 2 is a mechanism for positioning and holding the disc 19 with a center hub 21 made of magnetic material, such as a magneto-optical disc. An annular groove 16 is formed within the cylindrical portion 12, while being centered at the center of rotation of the turn table 3. A ring-like chucking magnet 10 is put into the annular ring 16. In FIG. 1, the disc 19 includes a stepped portion 22 is protruded downward from the central part of the undersurface of the disc. The disc 19 further includes a circular groove of which the under wall is defined by the stepped portion 22. The outer circumferential edge of the center hub 21 made of magnetic material, e.g., an iron plate is fit into the circular groove, whereby the center hub 21 is secured to the disc 19. The upper surface of the disc 19 is flush with the upper surface of the center hub 21. The chucking magnet 10 magnetically attracts the center hub 21 to it to generate a chucking force, so that the disc 19 is placed on and held by the disc chucking mechanism 1 by the chucking force. In a chucking state of the disc, a slight gap is present between the chucking magnet 10 and the center hub 21, and the undersurface of the stepped portion 22 is brought into contact with the disc mounting surface 15 to thereby position the disc 19 in its axial direction.

A base 51 of centering means 50 made of metal (to be described later) is put on the bottom of the annular groove 16 of the turn table 3. A magnet yoke 60, which is made of magnetic material, e.g., iron or stainless steel, is put on the centering means 50. Further, the chucking magnet 10 is placed on the magnet yoke 60.

Functionally, the centering means 50 centers the disc 19 at the center of rotation of the turn table 3 when the disc is set to the turn table. Structurally, the centering means 50 is formed with the base 51 and elastic portions 52. The elastic portions rise from the outer circumferential edge of the base 51 and along the outer surface of the annular groove 16, and are bent along the conical surface 14. Guide portions 53 are protruded outward in the radial direction of the turn table 3 from the ends of the elastic portions 52, respectively. The guide portions 53 are located within through-holes 31 of the turn table 3 such that the guide portions are radially movable by elastic forces of the elastic portions 52. The guide portions 53 are brought into contact with the inner circumferential edge of the center hole 20 of the disc 19. A part of the cylindrical portion 12 of the turn table 3 is radially outward raised to form protruded portions 7. The protruded portions are brought into contact with the inner circumferential edge of the center hole 20 of the disc 19. The centering means 50 having the guide portions 53, and the cylindrical portion 12 having the protruded portions 7 make up a mechanism for centering the disc 19.

The centering means 50 illustrated in FIG. 2 includes the annular base 51, three elastic portions 52 and three guide portions 53. Alternatively, the base 51 may be shaped in an arcuate form. In this case, two elastic portions 52 and two guide portions 53 are used.

As shown in FIGS. 1 and 2, the magnet yoke 60 is formed with a ring-like member 63, a plurality of (two in the instant embodiment) engaging portions 62, and a plurality of (three in the embodiment) magnet engaging portions 61. The engaging portions 62 are bent downward or toward the turn table 3 from the outer circumferential edge of the ring-like member 63. The magnet engaging portions 61 are bent upward or in the direction opposite to the bending direction of the engaging portions 62 from the outer circumferential edge of the ring-like member 63. The ring-like member 63 of the magnet yoke 60 is placed between the chucking magnet 10 and the turn table 3, more precisely the centering means 50.

The magnet engaging portions 61 of the magnet yoke 60 are bent along three tapered surfaces 10*a*, and brought into contact with the same. The tapered surfaces 10*a*, while being arrayed equidistantly in the angular direction, are radially and outwardly extended from the inner circumferential edge of the chucking magnet 10. Thus, the chucking magnet 10 is fixedly mounted onto the turn table 3 by means of the magnet yoke 60.

Stoppers 69 as protruded portions are protruded from the inner circumferential edge of the ring-like member 63 of the magnet yoke 60 in the same direction as of the magnet engaging portions 61, while each stopper 69 being located between the adjacent magnet engaging portions 61. Three cut-outs 10*c* are formed in the lower portion of the inner circumference of the chucking magnet 10, while corresponding in position to the stoppers 69 of the magnet yoke 60. When the chucking magnet 10 is placed on the magnet yoke 60, the stoppers 69 of the magnet yoke 60 are respectively fit into the cut-outs 10*c* of the chucking magnet 10, whereby it is immovable in the circumferential direction.

In the thus constructed disc chucking mechanism 1, when the disc 19 having the magnetic center hub 21 and the center hole 20 is set to the turn table 3, a magnetic force present between the chucking magnet 10 and the center hub 21 causes the undersurface of the stepped portion 22 of the disc 19 to come in contact with the disc mounting surface 15 of the turn table 3. As a result, it is axially positioned. During the chucking process, the circular edge of the center hole 20 of the disc 19 is guided by the guide portions 53 and the protruded portions 7, and the edge of the center hole 20 retracts to a predetermined chucking position, while resisting an urging force of the guide portions 53. In a state that the disc 19 is chucked, the circular edge of the center hole 20 of the disc 19 is in point contact with the guide portions 53 and the protruded portions 7, and radially outwardly urged by means of the guide portions 53. The peak points of the protruded portions 7, located on the opposite side when viewed in the urging direction, are in contact with the edge of the center hole 20 of the disc 19, to thereby hold back the radial movement of the disc 19, caused by the guide portions 53. The disc 19 is centered by the contact of the circular edge of the center hole 20 of the disc 19 with the guide portions 53 and the protruded portions 7.

In the above-mentioned embodiment, 1) the ring-like member 63 is inserted between the turn table 3 and the chucking magnet 10 used for producing a disc chucking force, and 2) the engaging portions 62 are extended from the ring-like member 63 of the magnet yoke 60 toward the turn table 3, and brought into engagement with the turn table 3, whereby the magnet yoke 60 is fastened to the turn table 3. Further, the magnet engaging portions 61 are extended in the direction opposite to the bending direction of the engaging portions 62, and the chucking magnet 10 is urgingly fixed by the magnet engaging portions 61, whereby the chucking magnet 10 is fastened to the turn table 3. The unique chucking-magnet mounting structure thus constructed is able to produce a satisfactorily large fixing strength when comparing with the conventional chucking-magnet mounting means in which the chucking magnet is bonded to the turn table by adhesive or mechanically fastened to the turn table by properly shaping the turn table or the hub table, and therefore reliably fastens the chucking magnet to the turn table. The chucking magnet 10 may be fastened to the turn table 3 by merely using an additional part, i.e., the magnet yoke 60, which can be formed by simple working, for example, pressing, of a magnetic material. The disc chucking mechanism does not need the careful working of the turn table 3, and hence may be reduced in cost to manufacture.

Further, it is noted that the magnet yoke 60 is made of magnetic material, and placed on the chucking magnet 10. The magnet yoke 60 forms a magnetic circuit, in cooperation with the chucking magnet 10. Therefore, the magnetic flux developed by the chucking magnet 10 is efficiently utilized to provide an increased chucking force. The magnet yoke 60 provides a magnetic path for the magnetic flux by the chucking magnet 10. Therefore, it serves as a shielding member for preventing the magnetic flux by the chucking magnet 10 from leaking to its vicinity is minimized. In this respect, there is less chance that the magnetic flux adversely affects the recording/reproducing operation of information to and from the disc 19, and other operations.

The magnet engaging portions 61 of the magnet yoke 60 are pressed against the tapered surfaces 10*a* of the chucking magnet 10, respectively, whereby the chucking magnet 10 is fastened onto the turn table 3. The chucking magnet 10 may be formed of rare-earth bond magnetic material, ferrite bond magnetic material, resin-bonding type bond magnetic material or may be formed of any other suitable magnetic material. The magnet is brittle and easy to be broken in the molding process or mounting work even if any magnetic material is used for making the magnet. In this connection, the corners are rounded and the tapered surfaces 10*a* are formed in the disc chucking mechanism of the invention. Therefore, there is less chance that this magnet breaking problem arises. Further, in the embodiment, to fasten the chucking magnet 10, the magnet engaging portions 61 are put on the tapered surfaces 10*a* of the chucking magnet 10 and urged in this state. This technical feature lessens a chance of breaking the chucking magnet 10.

Furthermore, the tapered surfaces 10*a* are formed at only the locations where those face the magnet engaging portions 61 of the magnet yoke 60. In other words, the area of the upper surface 10*b* of the chucking magnet 10 is relatively large, and hence, the magnetic attraction force of a satisfactory magnitude is secured.

Figure 3:
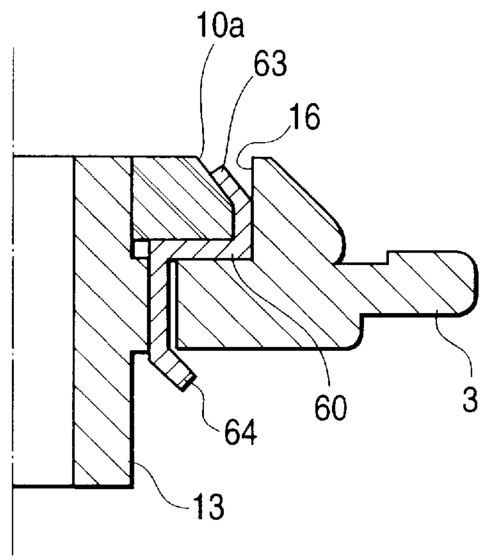
FIG. 3 is a cross sectional view showing a major portion of a disc chucking mechanism, which is a second embodiment of the invention.

Another embodiment of the present invention will be described with reference to FIG. 3. In the embodiment illustrated in FIGS. 1 and 2, the magnet engaging portions 61 of the magnet yoke 60 rise from the outer circumferential edge of the ring-like member 63 and extended along the inner surface of the chucking magnet 10, and are brought into contact with the tapered surfaces 10*a*, which are radially and outwardly extended from the inner circumferential edge of the chucking magnet 10, to thereby urgingly fix the chucking magnet 10. In the second embodiment shown in FIG. 3, magnet engaging portions 63 are extended upward from the outer circumferential edge of the ring-like member of the magnet yoke 60; are bent to the tapered surface 10*b* formed in the upper part of the chucking magnet 10; and the magnet engaging portions 63 are brought into contact with the tapered surface 10*b*. Also in the FIG. 3 embodiment, engaging portions 64 are extended downward from the inner circumferential edge of the ring-like member of the magnet yoke 60. The lower ends of the engaging portions 64 are made to pass through the holes of the turn table 3. The lower ends of the engaging portions 64 are then bent to the undersurface of the turn table 3. With this structure, the magnet yoke 60 is fastened to the turn table 3. In an alternative, the engaging portions 64 are located at positions which are displaced from the magnet engaging portions 63 in the circumferential direction, and are extended downward from the outer circumferential edge of the ring-like member of the magnet yoke 60. It is evident that the second embodiment thus constructed also produces substantially the same effects as of the first embodiment.

Figure 4:
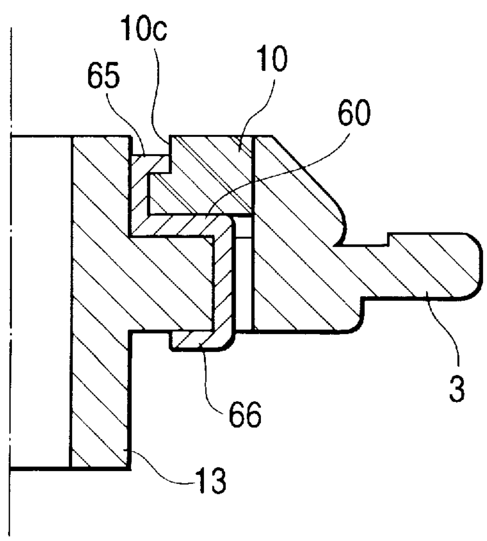
FIG. 4 is a cross sectional view showing a major portion of a disc chucking mechanism, which is a third embodiment of the invention.

A third embodiment of the invention will be described with reference to FIG. 4. In the embodiment, magnet engaging portions 65 are raised from the inner circumferential edge of the ring-like member of the magnet yoke 60 and extended along the inner circumferential surface of the chucking magnet 10, and are brought into contact with cut-outs 10*c* formed in the upper part of the inner circumference of the chucking magnet 10, whereby the chucking magnet 10 is urgingly fixed toward the turn table 3. Further, engaging portions 66 are extended downward from the outer circumference of the ring-like member of the magnet yoke 60; are made to pass through the holes of the turn table 3; and the lower ends of the engaging portions 66 are bent along the undersurface of the turn table 3, whereby the magnet yoke 60 is fastened to the turn table 3. The chucking magnet 10 is formed by molding any of the magnetic materials already stated into a desired shape. Inter alia, the resin-bonding type bond magnetic material may readily be molded into a desired shape. Therefore, when it is used for the chucking magnet 10, it is easy to form the cut-outs 10*c* in the FIG. 4 embodiment. It is evident that the second embodiment thus constructed also produces substantially the same effects as of the first embodiment.

The disc chucking mechanism constructed according to the present invention may be applied to any type of disc drive, if it uses a disc with a magnetic center hub.

While some specific embodiments of the present invention have been described, the present invention is not limited to the constructions above mentioned but may be changed, modified and altered within the scope of the invention. In the embodiment shown in FIG. 2, the centering means 50 takes the form of a single metal sheet including the base 51, the elastic portions 52 and the guide portions 53, which is formed by pressing a metal sheet. If required, the elastic portions 52 may be separated from the guide portions 53. Further, to form the centering means 50, the guide portions 53, radially movable, may be formed integral with the cylindrical portion 12.

Also in the FIG. 2 embodiment, the separate cut-outs 10*c* are formed in the lower portion of the inner circumference of the chucking magnet 10 at the positions corresponding to the magnet engaging portions 61 of the magnet yoke 60. Alternatively, a tapered surface 10*a* may be continuously formed over the entire inner or outer circumferential edge of the chucking magnet 10.

In a first disc chucking mechanism constructed according to the present invention, 1) the ring-like member is inserted between the turn table and the chucking magnet used for producing a disc chucking force, and 2) the engaging portions are extended from the ring-like member of the magnet yoke toward the turn table, and brought into engagement with the turn table, whereby the magnet yoke is fastened to the turn table. Further, the magnet engaging portions are extended in the direction opposite to the bending direction of the engaging portions, and the chucking magnet are urgingly fixed by the magnet engaging portions, whereby the chucking magnet is fastened to the turn table. The unique chucking-magnet mounting structure thus constructed is able to produce a satisfactorily large fixing strength when comparing with the conventional chucking-magnet mounting means in which the chucking magnet is bonded to the turn table by adhesive or mechanically fastened to the turn table by properly shaping the turn table or the hub table, and therefore reliably fastens the chucking magnet to the turn table. The chucking magnet may be fastened to the turn table by merely using an additional part, i.e., the magnet yoke, which can be formed by simple working, for example, pressing, of a magnetic material. The disc chucking mechanism does not need the careful working of the turn table, and hence may be reduced in cost to manufacture.

Further, it is noted that the magnet yoke is made of magnetic material, and placed on the chucking magnet. It functions as a yoke of the chucking magnet. Therefore, the magnetic flux developed by the chucking magnet is efficiently utilized to provide an increased chucking force. The magnet yoke provides a magnetic path for the magnetic flux by the chucking magnet. Therefore, it serves as a shielding member for preventing the magnetic flux by the chucking magnet from leaking to its vicinity is minimized. In this respect, there is less chance that the magnetic flux adversely affects the recording/reproducing operation of information to and from the disc, and other operations.

In a second disc chucking mechanism of the invention, the tapered surfaces are formed on the inner or outer circumferential edge of the chucking magnet. The magnet engaging portions of the magnet yoke are bent toward the tapered surfaces. Therefore, the magnet engaging portions are put on the tapered surfaces of the chucking magnet, respectively, and the chucking magnet are hard to be broken.

In a third disc chucking mechanism of the invention, the chucking magnet includes the cut-outs. The cut-outs are engaged with the magnet yoke, whereby the chucking magnet is immovable in the circumferential direction. Any special means is not required for restraining the rotation of the chucking magnet.

What is claimed is:

1. A disc chucking mechanism comprising:

a turn table, on which a disc with a center hole is disposed, driven by a rotation driving means;

a chucking magnet for magnetically attracting a center hub of the disc;

a magnet yoke including:

a ring-like member inserted between said turn table and said chucking magnet;

engaging portions extended from the ring-like member of the magnet yoke toward the turn table non-extending direction, and brought into engagement with said turn table; and magnet engaging portions extended in the direction opposite to the extending direction of the engaging portions, and fixing the chucking magnet.

2. A disc chucking mechanism according to claim 1, wherein said magnet yoke is formed, by pressing a magnetic member, to have said ring-like member, said engaging portions and said magnet engaging portions in one body.

3. A disc chucking mechanism according to claim 1, wherein said chucking magnet includes tapered surfaces formed on the inner or outer circumferential edge thereof, and said magnet engaging portions of said magnet yoke are bent toward said tapered surfaces.

4. A disc chucking mechanism according to claim 3, wherein said tapered surfaces of said chucking magnet are independently arrayed in the circumferential direction.

5. A disc chucking mechanism according to claim 1, wherein said chucking magnet includes cut-outs, said magnet yoke includes protruded stoppers, and when said stoppers of said magnet yoke are respectively fit into the cut-outs of said chucking magnet, said chucking magnet is immovable in the circumferential direction.

6. A disc chucking mechanism according to claim 1, wherein said turn table includes centering means for making the center of said disc coincident with the center of rotation of said turn table.

7. A disc chucking mechanism according to claim 6, wherein said centering means is formed, by pressing a metal sheet, to have guide portions for urging said disc radially outwardly when said guide portions come in contact with said center hole of the disc.

8. A disc chucking mechanism according to claim 6, wherein said ring-like member of said magnet yoke and part of said centering means are interposed between said chucking magnet and said turn table.

9. A disc chucking mechanism comprising:

a turn table, on which a disc with a center hole is disposed, driven by a rotation driving mechanism;

a chucking magnet for magnetically attracting a center hub of the disc;

a magnet yoke including:

a ring-like member inserted between said turn table and said chucking magnet;

an engaging portion extended from the ring-like member of the magnet yoke toward the turn table non-extending direction, and brought into engagement with said turn table; and a magnet engaging portion extended in the direction opposite to the extending direction of the engaging portion, and fixing the chucking magnet.

10. A disc chucking mechanism according to claim 9, wherein said magnet yoke is formed, by pressing a magnetic member, to have said ring-like member, said engaging portion and said magnet engaging portion in one body.

11. A disc chucking mechanism according to claim 9, wherein said chucking magnet includes a tapered surface formed on an inner or an outer circumferential edge thereof, and said magnet engaging portion of said magnet yoke is bent toward said tapered surface.

* * * * *